(12) United States Patent
Coene et al.

(10) Patent No.: US 11,260,781 B2
(45) Date of Patent: Mar. 1, 2022

(54) SUSPENSION ARRANGEMENT FOR A SEAT AND METHOD OF PRODUCING AN ELONGATE SUSPENSION MEMBER FOR A SUSPENSION ARRANGEMENT FOR A SEAT

(71) Applicant: PULLMAFLEX BENELUX NV, Wevelgem (BE)

(72) Inventors: Stijn Coene, Deinze (BE); Maxime Samain, Harelbeke (BE); Andreas Weinmüller, Baden (AT)

(73) Assignee: PULLMAFLEX BENELUX NV, Wevelgem (BE)

( * ) Notice: Subject to any disclaimer, the term of this patent is extended or adjusted under 35 U.S.C. 154(b) by 0 days.

(21) Appl. No.: 16/971,952

(22) PCT Filed: Feb. 13, 2019

(86) PCT No.: PCT/EP2019/053562
§ 371 (c)(1),
(2) Date: Aug. 21, 2020

(87) PCT Pub. No.: WO2019/162166
PCT Pub. Date: Aug. 29, 2019

(65) Prior Publication Data
US 2020/0391636 A1   Dec. 17, 2020

(30) Foreign Application Priority Data
Feb. 22, 2018 (EP) ..................................... 18158122

(51) Int. Cl.
*B60N 2/54* (2006.01)
*B60N 2/70* (2006.01)
(Continued)

(52) U.S. Cl.
CPC .............. *B60N 2/7094* (2013.01); *A47C 7/30* (2013.01); *B60N 2/686* (2013.01); *B60N 2/7017* (2013.01)

(58) Field of Classification Search
CPC ...... A47C 7/30; B60N 2/7041; B60N 2/7094; B60N 2/686
See application file for complete search history.

(56) References Cited

U.S. PATENT DOCUMENTS 3,423,775 A   1/1969  Cockerill
4,368,917 A *  1/1983 Urai ........................ A47C 7/16
                                               297/452.15
(Continued)

FOREIGN PATENT DOCUMENTS

CN    2104780 U    5/1992
CN  202378734 U    8/2012
(Continued)

OTHER PUBLICATIONS

Search Report issued from the Chinese Patent Office for related Application No. 2019101293661 dated Dec. 23, 2020 (3 Pages).
(Continued)

*Primary Examiner* — Shin H Kim
(74) *Attorney, Agent, or Firm* — Michael Best & Friedrich LLP

(57) ABSTRACT

The present invention relates to a suspension arrangement (20, 120) for a seat comprising a plurality of elongate suspension members (21, 22, 121, 122) of a glass fibre filled plastic. Each elongate suspension member (21, 22, 121, 122) of the plurality of elongate suspension members includes in a longitudinal direction thereof a first end (23, 25, 123, 125) and an opposing second end (24, 26, 124, 126). The elongate suspension member (21, 22, 121, 122) has a meandered shape in the longitudinal direction. The present invention
(Continued)

relates furthermore to a method for producing an elongate suspension member (21, 22, 121, 122).

28 Claims, 12 Drawing Sheets

(51) Int. Cl.
    *B60N 2/68*         (2006.01)
    *B60N 2/64*         (2006.01)
    *A47C 7/30*         (2006.01)

(56) References Cited

U.S. PATENT DOCUMENTS

| | | | |
|---|---|---|---|
| 4,423,102 A * | 12/1983 | Danton | A47C 7/26 428/92 |
| 5,116,556 A * | 5/1992 | Danton | B29C 33/0044 264/46.4 |
| 5,709,920 A * | 1/1998 | Danton | A47C 7/26 428/68 |
| 6,402,246 B1 | 6/2002 | Mundell | |
| 6,783,184 B2 * | 8/2004 | DiBattista | B29C 49/20 297/452.14 |
| 7,353,553 B2 | 4/2008 | Huse | |
| 8,434,822 B2 * | 5/2013 | Asbjornsen | A47C 1/035 297/316 |
| 9,308,846 B2 * | 4/2016 | Sugiyama | B60N 2/72 |
| 9,623,777 B2 * | 4/2017 | Sammons | B60N 2/72 |
| 9,796,310 B1 * | 10/2017 | Line | B60N 2/4221 |
| 2005/0235416 A1 * | 10/2005 | Jansen | A47C 23/06 5/236.1 |
| 2007/0001504 A1 * | 1/2007 | Mayer | A47C 7/30 297/440.1 |
| 2008/0185760 A1 * | 8/2008 | Jansen | A47C 23/06 267/100 |
| 2010/0171343 A1 * | 7/2010 | Asbjornsen | A47C 1/035 297/69 |
| 2014/0021769 A1 * | 1/2014 | Sugiyama | B60N 2/646 297/452.58 |
| 2016/0185265 A1 * | 6/2016 | Romer | B60N 2/686 297/216.1 |
| 2016/0193947 A1 * | 7/2016 | Sugiyama | B60N 2/64 297/452.18 |
| 2016/0368404 A1 * | 12/2016 | Sammons | B60N 2/7047 |
| 2019/0039480 A1 * | 2/2019 | Hunt | B60N 2/7094 |
| 2019/0106027 A1 * | 4/2019 | Jonsson | B60N 2/427 |
| 2020/0148082 A1 * | 5/2020 | Cha | B60N 2/72 |
| 2020/0391636 A1 * | 12/2020 | Coene | A47C 7/30 |

FOREIGN PATENT DOCUMENTS

| | | |
|---|---|---|
| DE | 4309837 A1 | 9/1994 |
| DE | 102015212510 A1 | 1/2017 |
| EP | 0720826 A1 | 7/1996 |
| EP | 1428458 A1 | 6/2004 |
| EP | 2985179 A1 | 2/2016 |
| GB | 2082451 A | 3/1982 |
| GB | 2220137 A | 1/1990 |

OTHER PUBLICATIONS

International Search Report and Written Opinion for Application No. PCT/EP2019/053562, dated May 16, 2019 (14 pages).

* cited by examiner

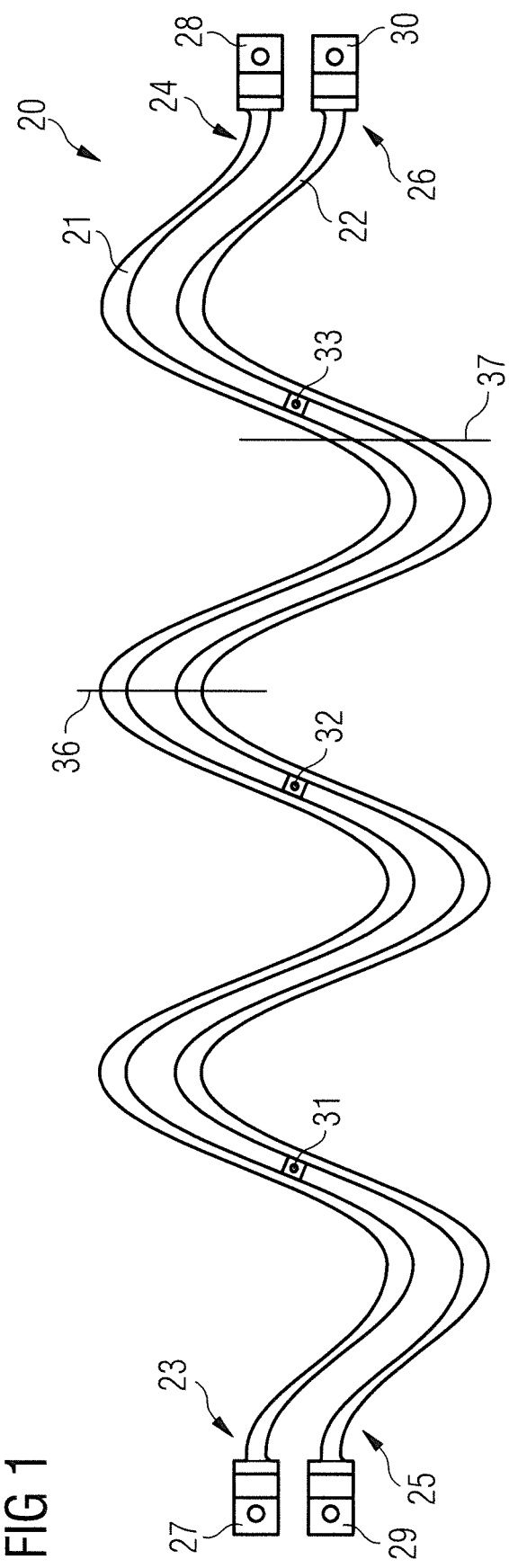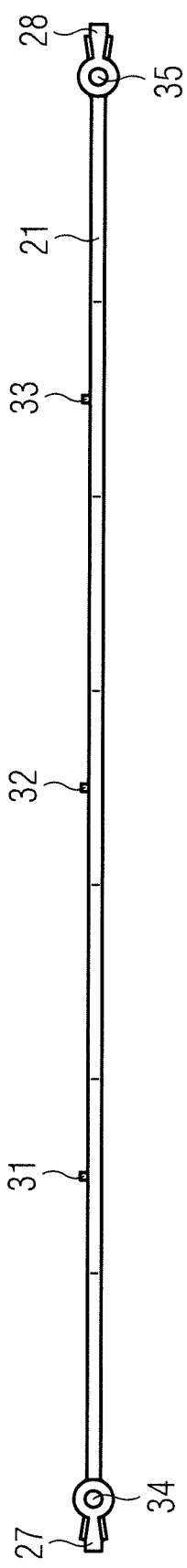

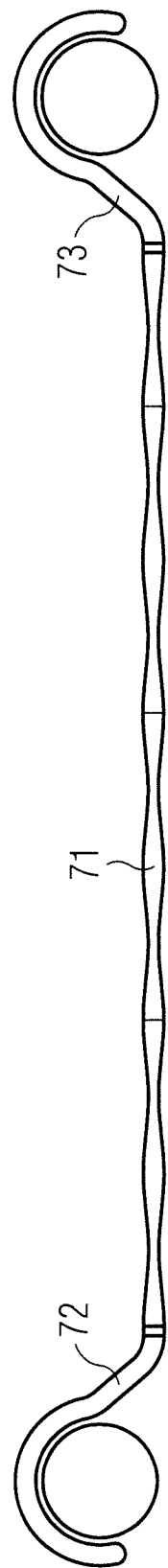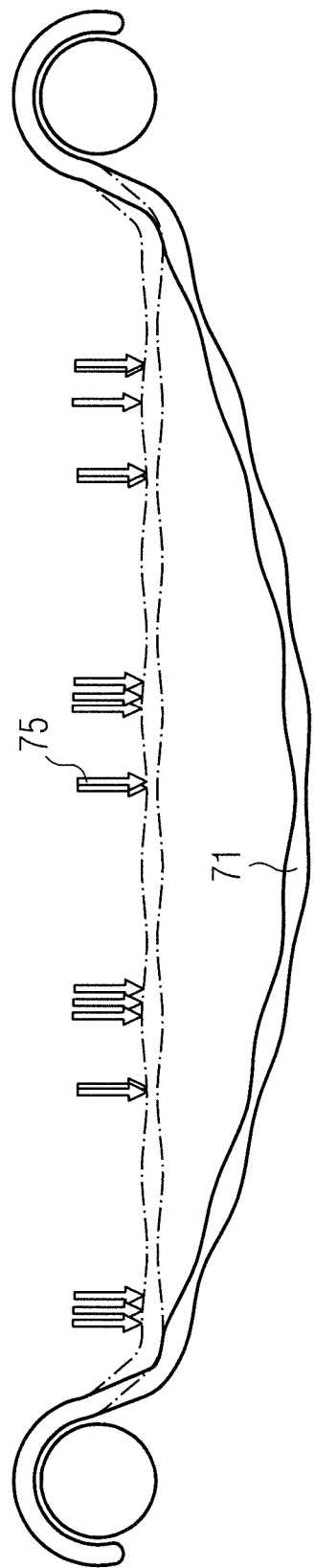

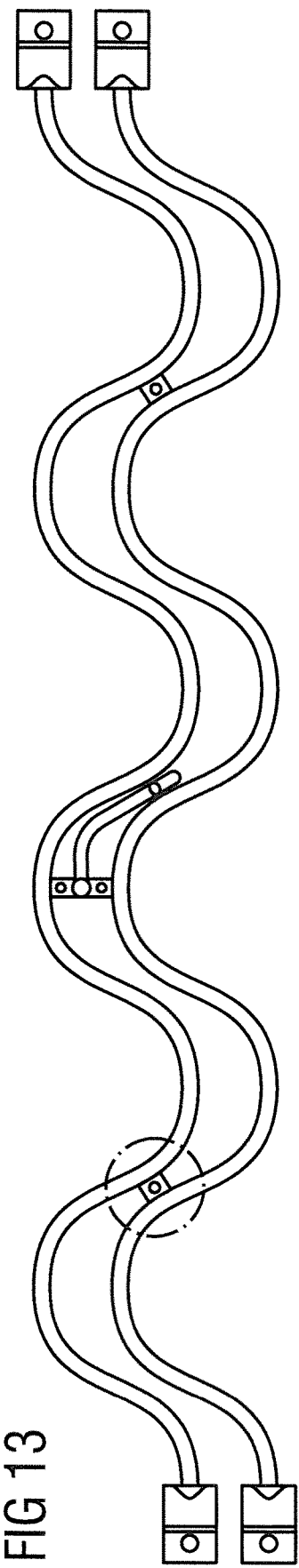
FIG 13
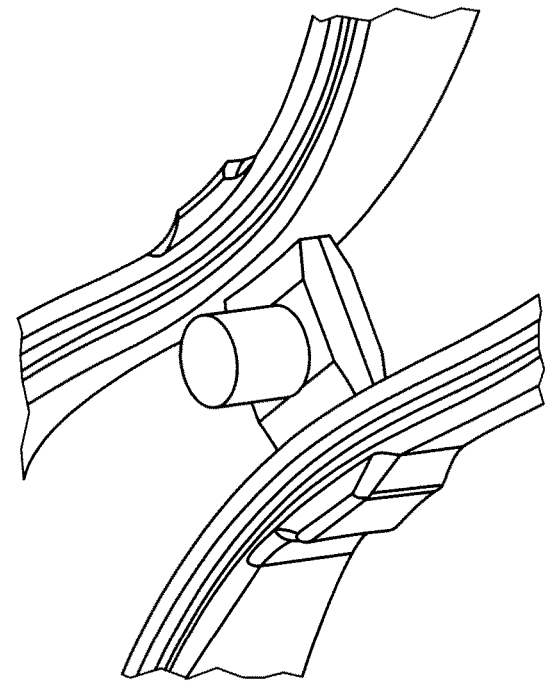
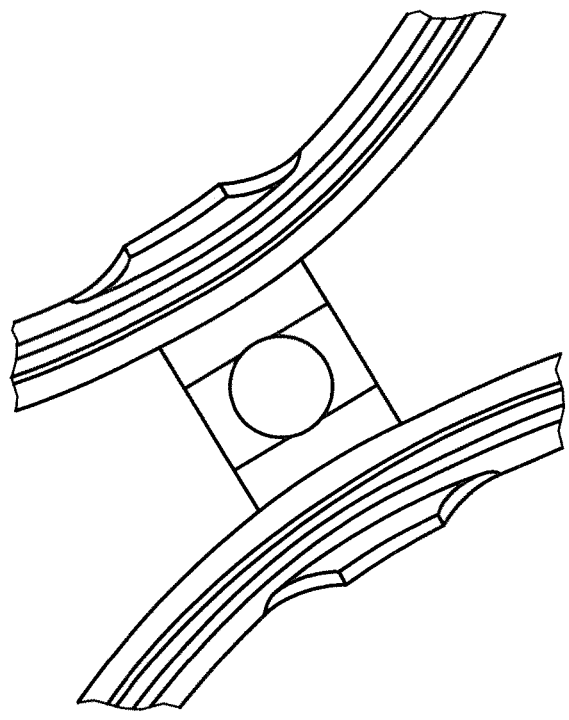
FIG 14

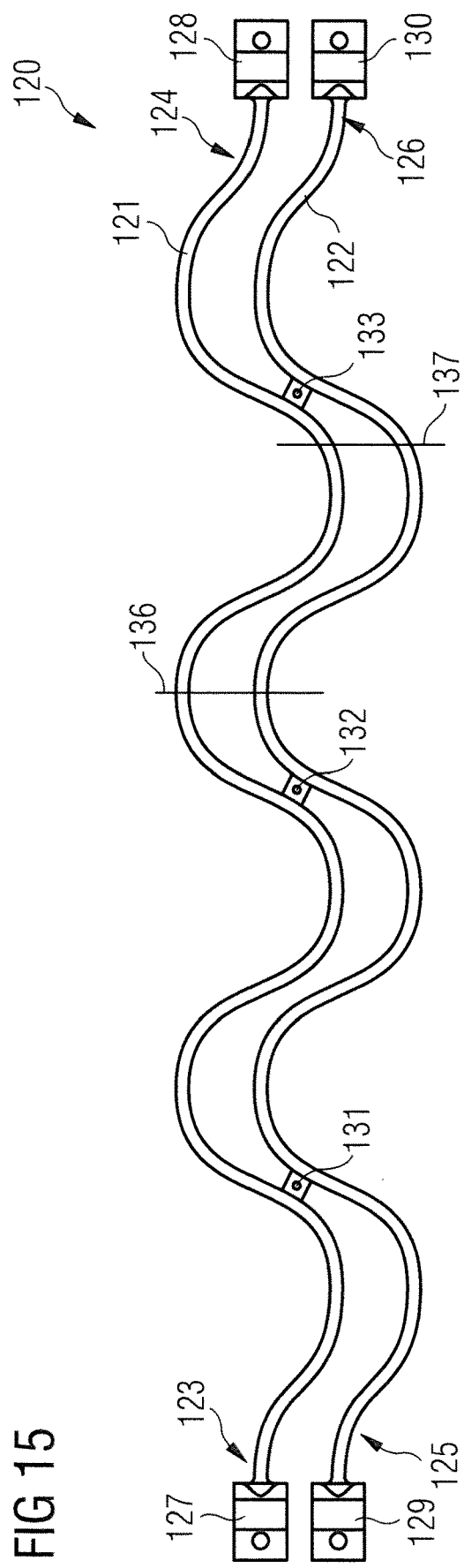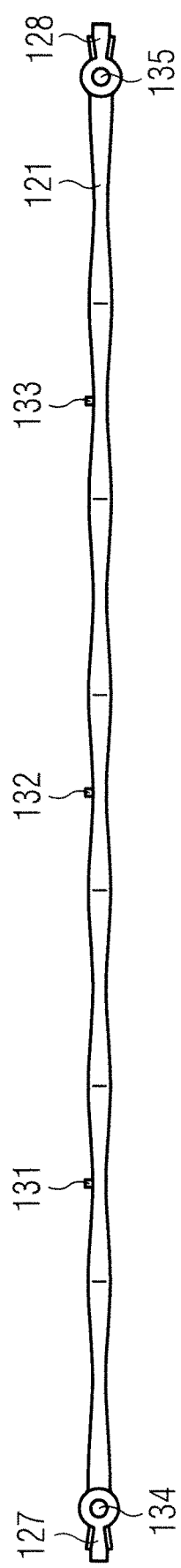

SUSPENSION ARRANGEMENT FOR A SEAT AND METHOD OF PRODUCING AN ELONGATE SUSPENSION MEMBER FOR A SUSPENSION ARRANGEMENT FOR A SEAT

The present invention relates to a suspension arrangement for a seat and a method of producing an elongate suspension member for a suspension arrangement for a seat. The present invention relates in particular to a suspension arrangement for a vehicle seat pan.

A seat area and/or a backrest of a chair or seat may comprise as upholstery a flexible suspension system in connection with a foam covered by textile or leather surface materials. In particular in the automobile industry there is a demand for reducing weight and installation space of vehicle seats. Reducing installation space may be achieved by reducing the thickness of the foam. On the other hand, and evenly distributed support for the occupant is required for reasons of comfort and damping.

Current suspension technology uses for example several spring steel wires in a seat pan or a backrest covered by foam. The deflection of the suspension is accomplished by the elongation of the steel wires, caused by twists or extended with springs. For achieving an evenly distributed support for the occupant and the requested damping, a foam is added on top of the suspension. Metal suspension may provide discontinuous support and may be limited in shape and variation of the design. For reasons of weight, only a limited number of wires support the foam surface and therefore the foam layer may be thick to cover the gaps between the wires. Furthermore, the damping of the metal suspension may need to be optimised by a thicker foam layer. The metal suspension may be overmoulded for avoiding noise, to add coverage and to have a free attachment link with the seat pan. This may add additional processing steps when manufacturing the vehicle seat.

As an alternative, the suspension system may comprise textiles and/or thermoplastic elastomers. However, such suspension systems may have reduced stability and may be influenced by creep and temperature.

In view of the above, there is a need in the art for a suspension arrangement and a method of producing the suspension arrangement which address some of the above drawbacks.

These and other needs are addressed by a suspension arrangement for a seat, and a method for producing an elongate suspension member for a suspension arrangement for a seat as defined in the independent claims. The dependent claims define embodiments.

According to an embodiment, a suspension arrangement for a seat is provided. The suspension arrangement comprises a plurality of elongate suspension members of a glass fibre filled plastic. Each elongate suspension member may have a form of a stripe, cord or band. Each elongate suspension member of the plurality of elongate suspension members includes in a longitudinal direction thereof a first end and an opposing second end. The elongate suspension member has a meandered shape in the longitudinal direction. The meandered shape enables an accurate adjustment of the required suspension properties and increases the area of support for a foam arranged on the suspension arrangement such that the thickness of the foam may be reduced. Furthermore, the weight of the suspension arrangement may be reduced compared to a suspension arrangement made of steel. The use of glass fibre filled plastic may contribute to reduce creeping and temperature sensitivity of the suspension arrangement.

The meandered shape may comprise a plurality of curved sections with alternating curvature directions. For example, each or at least some of the elongate suspension members may comprise each 4 to 10 curved sections with alternating curvature directions, for example a first section curved to the left, followed by a second section curved to the right, followed by a third section curved to the left, followed by a fourth section curved to the right and so on. The curved sections may extend in a plane such that the elongate suspension member may have a shape like a snake winding in a wave on the plane or like a transverse wave.

As an option, the meandered shape may comprise a sinusoidal section. For example, the elongate suspension member may have a sinusoidal shape from the first end to the second end. As an alternative, the meandered shape may comprise arcs, for example arcs each comprising three quarter to half of a circle.

The meandered shape may support elasticity of the elongate suspension member in the longitudinal direction.

An amplitude of the meandered shape may be at least the thirtieth part ($1/30$), preferably at least the twentieth part ($1/20$), of the distance from the first end to the second end in a relaxed state of the elongate suspension member. For example, the elongate suspension member may have a length of 40 to 50 cm in the relaxed state, more typically between 20 and 40 cm, for example 28 cm. The amplitude of the meandered shape, for example the amplitude of the sinusoidal shape, may be in a range from 0.5 to 5 cm. For example, the minimum amplitude may be around 8 mm and typically around 14 mm. One sinus height (peak-to-peak) is then the amplitude multiplied by a factor of two, typically around 28 mm.

Furthermore, an amplitude of the meandered shape may vary along the longitudinal direction from the first and the second end. For example, in the longitudinal direction of the elongate suspension member, an amplitude at a central section may be larger than an amplitude at a section between the central section and the first end or an amplitude at a section between the central section and the second end. For example, an amplitude at the central section may be 1 or 2 cm larger than the amplitude at the sections between the central section and the first and second ends. In another example, the amplitude may increase from the first end to the middle of the elongate suspension member and may decrease from the middle to the second end.

As another option, a cross-section of the elongate suspension member may vary depending on the position along the elongate suspension member from the first end to the second end. The cross section at a certain position may be defined as a cross-section in a plane perpendicular to a tangent at the certain position. For example, the cross section at am inflection point of the sinusoidal shape may be smaller than the cross section at a minimum or maximum of the sinusoidal shape. The cross-section may increase from a first inflection point of the sinusoidal shape to the minimum of the sinusoidal shape, may then decrease from the minimum of the sinusoidal shape to a second inflection point of the sinusoidal shape, may then increase from the second inflection point of the sinusoidal shape to the maximum of the sinusoidal shape, and may then decrease from the maximum of the sinusoidal shape to a third inflection point of the sinusoidal shape. Varying the cross section may include varying a width and/or height of the cross-section.

When the first and second ends are stationary fixed, the elongate suspension member may be deflected in a direction perpendicular to the plane in which the longitudinal direction and the curved sections extend.

For each deflection there is a corresponding overall strain/elongation of the elongate suspension member. As described above, the elongate suspension member may have a sinusoidal shape with a variable width and/or height resulting in a more wiped out strain path along the edges of the sinusoidal shape. This shape may result in a material strain which is smaller than an overall strain of the elongate suspension member at a certain deflection, resulting in a reduced impact of temperature and creep on the material.

According to an embodiment, a first elongate suspension member of the plurality of elongate suspension members and a second elongate suspension member of the plurality of elongate suspension members have the same meandered shape. The first and second elongate suspension members are arranged spaced apart in a parallel manner in a plane extending in the longitudinal direction and in a direction of an amplitude of the meandered shape. Further elongate suspension members, for example a third elongate suspension member, a fourth elongate suspension member and so on of the plurality of elongate suspension members, may have also the same meandered shape and may also be arranged spaced apart in a parallel manner to each other in the same plane. Thus, a smooth supported distribution of the weight introduced by an occupant may be accomplished.

Furthermore, the suspension arrangement may comprise a connecting element for connecting the first elongate suspension member and the second elongate suspension member. The first elongate suspension member and the second elongate suspension member may be connected to each other with the connecting element at an inflection point of the meandered shape. Further connecting elements may be provided for connecting the first and second elongate suspension members at further connecting points, preferably at further inflection points, and for connecting further elongate suspension members to each other and to the first and second elongate suspension members. Connecting the elongate suspension members may contribute to further distribute the supported weight among the elongate suspension members.

As an alternative to arranging and coupling the plurality of elongate suspension members in an essentially parallel arrangement in a plane, the elongate suspension members may be coupled to each other at their first ends and may extend in different radial directions to be connected to a frame of the seat with their second ends.

According to an embodiment, the plastic comprises polyphthalamide. As another option, the plastic may comprise medium viscosity partly aromatic polyamide. Furthermore, the glass fibre filled plastic may comprise plastic with a glass fibre content in a range of 50% to 60%. As a further option, the glass fibre filled plastic may comprise polytetrafluoroethylene. The amount of polytetrafluoroethylene may be in a range of 0.5 to 5% by weight.

The above-described materials comprised by the glass fibre filled plastic may provide a low sensitivity with respect to a change of temperature or creep, in particular in case the material strain is kept low. In particular, for improving the creep performance, the glass fibre filled plastic may comprise a polymer with a much higher glass transition temperature than other plastics, for example nylons. Further, the above described materials also provide a very limited water absorption, which may avoid changes in mechanical properties between dry parts and condensed parts.

The suspension arrangement may be configured as a suspension arrangement for a seat pan, for example for a seat pan of a vehicle seat. The suspension arrangement comprising the plurality of elongate suspension members with the meandered shape allows to evenly distribute support forces from an occupant, which allows to reduce the foam thickness. Furthermore, with different sinusoidal shapes in different locations of the seat pan variations in comfort may be realised. The use of glass fibre filled plastic avoids secondary overmoulding thus reducing production complexity. The suspension arrangement may be extended to include also carrier and comfort functions for the complete cushion support. Typically the rest of the cushion support is separate from a metal wire suspension. However, this suspension arrangement including the above material structure may be strong enough to fulfill the whole function of carrying other applications, for example cushion length adjuster, static or variable side support, adjustable bolster systems, massage systems, etc., and may fulfill crash requirements, like submarine issues. Also it may be used to carry parts like motors, actuators, mechanical and electrical cables, battery packs for electrical cars, and may provide an ideal 3D comfort profile for the end user. Further, an ideal and smooth transition between rigid front pan and edges versus the smooth deflection area may be provided.

According to another embodiment, a seat is provided comprising a frame and a suspension arrangement as described above. The frame may be a frame of a seat pan of e seating surface of the seat or a frame of a backrest of the seat. At least one of the first and second ends of at least one elongate suspension member of the plurality of elongate suspension members is attached to the frame. For example, the elongate suspension members may be arranged in parallel attached to the frame, or the elongate suspension members may be arranged in different radial directions attached to the frame.

According to a further embodiment, the at least one elongate suspension member is attached to the frame in a state in which the at least one elongate suspension member is pre-stressed in its longitudinal direction. Pre-stressing the elongate suspension members enables to adjust a required level of comfort in connection with using the suspension arrangement in a seat pan or a backrest.

The frame may comprise a rod and at least one of the first and second ends of the elongate suspension members is attached to the rod by at least partially enclosing a section of the rod. For example, at the first end and/or the second end an attachment section may be provided which includes a hole through which the rod of the frame extends. The attachment section may be formed integrally with the elongate suspension member. Thus, a reliable attachment of the elongate suspension member at the rod may be accomplished.

In another example, for reducing the local stress in the meandered shape, the ends may be attached in a way they can rotate.

In a further example, in particular in case the elongate suspension member and the seat pan is integrally formed (one product), additional flexible design features may be included, for example V-shaped bending sections.

The suspension arrangement may comprise at least 15 elongate suspension members, more preferably the suspension arrangement may comprise at least 20 to 25 suspension members.

The seat may furthermore comprise a foam support arranged on the plurality of elongated suspension members. The foam support may comprise a foam layer made of rubber foam or any other expanded material.

The large number of elongate suspension members compared to a conventional number of only four metal wires may provide smaller gaps between the elongate suspension members, which may create an improved foam support to allow a thinner foam layer. Furthermore, by using the glass fibre filled plastic, vibration damping may be improved compared to steel wires, which further allows to reduce the thickness of the foam layer.

According to a further embodiment, the frame and the plurality of elongate suspension members may be integrally formed. Thus, a weight of the seat may be reduced.

According to the present invention, a method for producing an elongate suspension member for a suspension arrangement for a seat is provided. The elongate suspension member includes in a longitudinal direction a first end and an opposing second end. The elongate suspension member has a meandered shape in the longitudinal direction. According to the method, gas is mixed into a glass fibre filled plastic, and the mixture of gas and glass fibre filled plastic is injected into a mould having a moulding cavity with the meandered shape. Using a gas injection technology may reduce cycle times by reducing injection and cooling times, and may additionally optimise warpage. Furthermore, mixing gas into the glass fibre filled plastic may improve the viscosity by lowering the viscosity, which may contribute to more easily push the materials through small cavities forming the meandered elongate suspension member such that many injection points may be avoided.

The method may be used for producing the elongate suspension member of the suspension arrangement described above. Furthermore, the method may be used for producing the frame of a seat pan or backrest and the plurality of elongate suspension members by integrally forming those elements.

The glass fibre filled plastic may be tempered (heat stabilised) after moulding. In particular creeping and susceptibility to moisture may be reduced by tempering the elongate suspension members made of glass fibre filled plastic. For example, the glass fibre filled plastic may be tempered at a temperature of at least 130° C., preferably at a temperature of 230° C. At these temperatures, the glass fibre filled plastic may be tempered for at least 20 minutes.

Embodiments of the invention will be described with reference to the accompanying drawings.

FIG. 1 is a schematic top view of a suspension arrangement for a seat according to an embodiment.

FIG. 2 is a schematic side view of a suspension arrangement for a seat according to an embodiment.

FIG. 8 is a schematic side view of an elongate suspension member according to an embodiment.

FIG. 9 is a schematic side view of the elongate suspension member of FIG. 8 in the bent state.

FIG. 13 shows schematically an injection area in the middle point of a sinusoidal shape of a meandered elongate suspension member according to an embodiment.

FIG. 14 shows schematically enlarged views of the injection area of FIG. 6.

FIG. 15 is a schematic top view of an suspension arrangement for a seat according to an embodiment.

FIG. 16 is a schematic side view of a suspension arrangement for a seat according to an embodiment.

Figure 3:
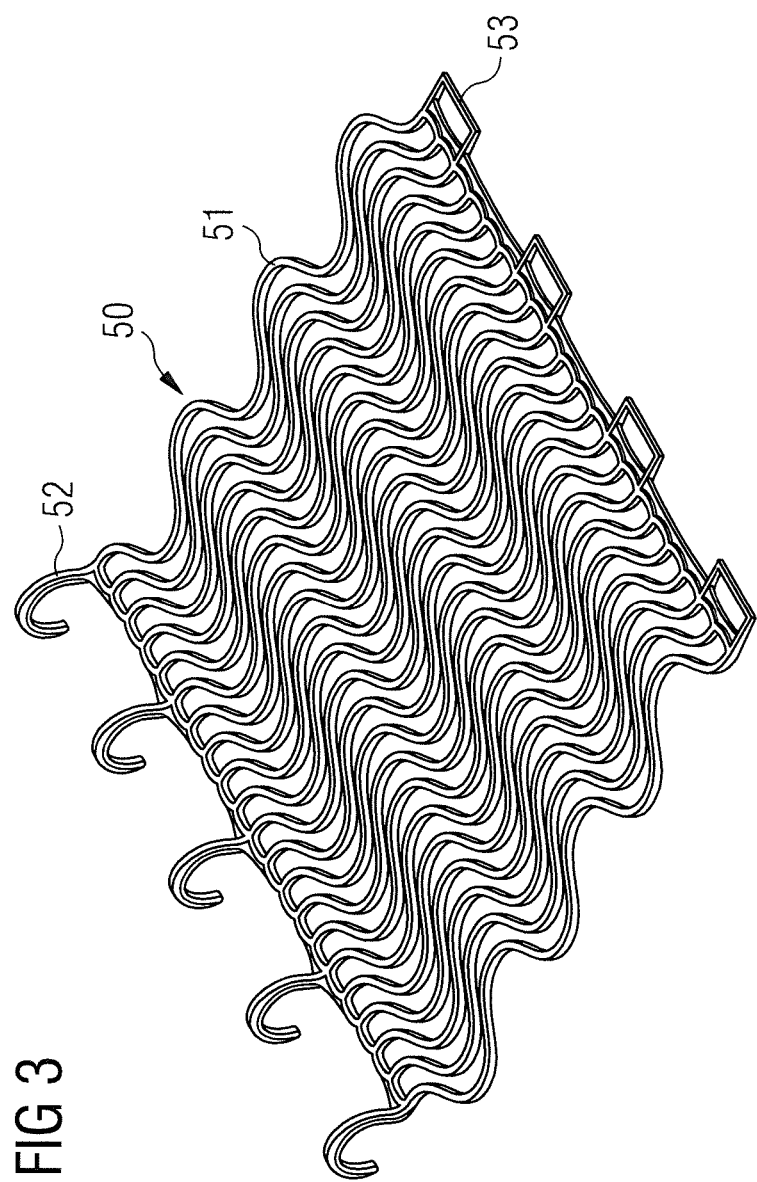
FIG. 3 is a schematic perspective view of a suspension arrangement for a seat according to an embodiment.

Exemplary embodiments of the invention will now be described with reference to the drawings. While some embodiments will be described in the context of specific fields of application, the embodiments are not limited to this field of application. Further, the features of the various embodiments may be combined with each other unless specifically noted otherwise.

FIG. 1 is a schematic top view of a suspension arrangement 20 for a seat, for example for a seat pan or a backrest of a seat. The seat may comprise a seat of a vehicle. The suspension arrangement 20 comprises a plurality of elongate suspension members 21, 22 of glass fibre filled plastic. The suspension arrangement shown in FIG. 1 comprises only two elongate suspension members 21, 22 for reasons of clarity, but the suspension arrangement 20 may comprise more than the two elongate suspension members 21, 22, for example at least 15 or 20 elongate suspension members. Each elongate suspension member 21, 22 of the plurality of elongate suspension members includes in a longitudinal direction thereof a first end and an opposing second end. In FIG. 1 the longitudinal direction is extending from the left to the right. The elongate suspension member 21 may have its first end 23 at the left side in FIG. 1 and may have its second end 24 at the right side in FIG. 1. Likewise, the elongate suspension member 22 may include the first end 25 and the second end 26. The elongate suspension member 21, 22 has a meandered shape in the longitudinal direction. For example, as shown in FIG. 1, the elongate suspension member 21, 22 may have a sinusoidal shape. At each of the first and second ends 23 to 26 a corresponding attachment element 27 to 30 may be provided for attaching the first and second ends to a frame of a seat pan or a backrest of the seat.

Connecting elements 31 to 33 may be provided for coupling the elongate suspension members 21, 22 with each other. For example, as shown in FIG. 1, the elongate suspension member 21 may be coupled at three positions to the elongate suspension member 22 via corresponding connecting elements 31 to 33. The coupling between the elongate suspension members 21, 22 may be at inflection points of the meandered shape as shown in FIG. 1.

FIG. 2 shows a schematic side view of the elongate suspension member 21. Each attachment element 27 to 30 may provide a hole for attaching the corresponding end of the elongate suspension member to for example a frame of the seat pan or backrest. As shown in FIG. 2, attachment element 27 may provide a hole 34, and attachment element 28 may provide a hole 35. Rods of the frame may be arranged such that they extend through the holes 34, 35 of the elongate suspension members. Thus, the suspension members may be arranged spaced apart from each other in a parallel manner in a plane as shown in FIG. 1. The plane is extending in the longitudinal direction and in a direction of an amplitude of the meandered shape. By means of the holes 34, 35 and the rods of the frame, the attachment of the elongate suspension members 21, 22 to the frame is flexible, in particular rotational around the rods such that sharp bending of the elongate suspension members may be avoided when the elongate suspension members are deflected in a direction perpendicular to the plane in which they are extending.

Figure 4:
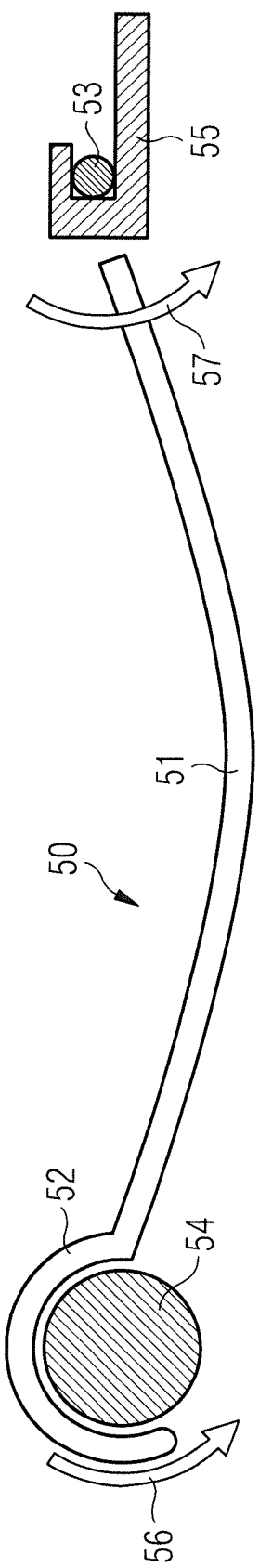
FIG. 4 is a schematic side view of an elongate suspension member of the suspension arrangement shown in FIG. 3.

FIG. 3 shows a further exemplary suspension arrangement 50 comprising a plurality of elongate suspension members 51. For attaching the suspension arrangement 50 to a frame, the suspension arrangement comprises at one side a plurality of hook elements 52 and at the other opposite side a plurality of loop elements 53. As shown in FIG. 4, the hook elements 52 may engage with a rod 54 of the frame, and the loop elements 53 may engage with corresponding hook elements 55 at the frame. The attachment of the suspension arrangement 50 to the frame is pivotable as indicated by arrows 56 and 57 such that stress to the suspension arrangement 50 in the attachment area may be reduced when the elongate suspension members 51 are loaded and bent as shown in FIG. 4.

Figure 5:
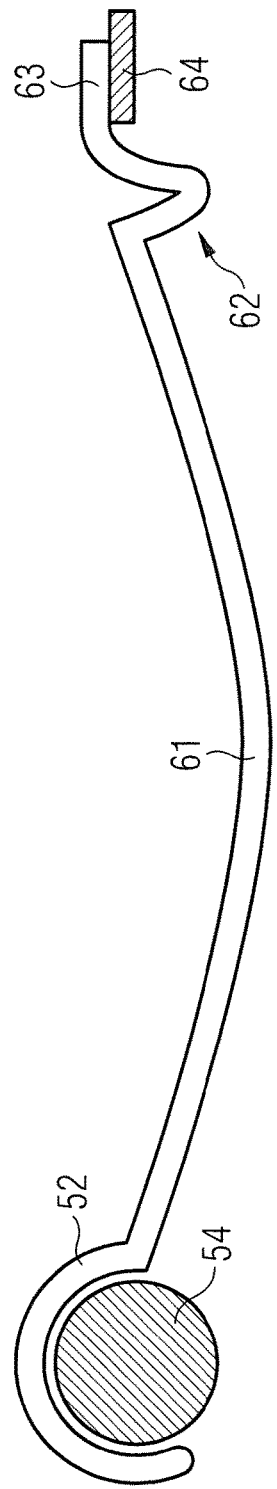
FIG. 5 is a schematic side view of an elongate suspension member according to an embodiment.
Figure 6:
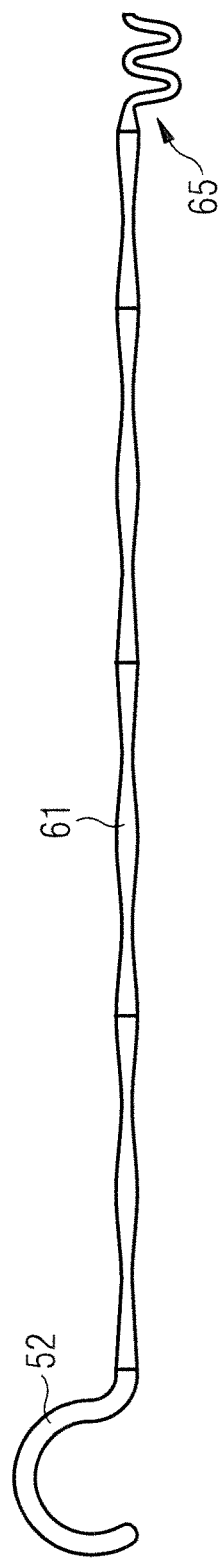
FIG. 6 is a schematic side view of an elongate suspension member according to a further embodiment.
Figure 7:
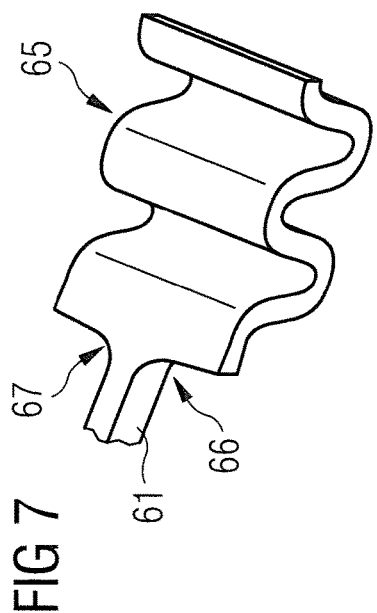
FIG. 7 is a schematic perspective view of the W-profile section of the elongate suspension member shown in FIG. 6.

FIG. 5 shows a further exemplary elongate suspension member 61, which is similar to the elongate suspension member 51 of FIGS. 3 and 4 and which may be comprised in a suspension arrangement similar to the suspension arrangement 50 shown in FIG. 3. The elongate suspension member 61 is in a bent state. The elongate suspension member 61 comprises, for attaching the elongate suspension member 61 to a frame, at one side a hook element 52 as described above in connection with FIGS. 3 and 4, and at the other opposite side a V-shaped profile 62. The hook element 52 may engage with a rod 54 of the frame, and an end section 63 at the opposite side of the elongate suspension member 61 may be fixedly connected to a part 64 of the frame. The V-shaped profile 62 provides flexibility and may therefore cause a stress reduction when the elongate suspension member 61 is loaded and bent as shown in FIG. 5. The V-shaped profile is only an example for a flexible section, and other kinds of flexible sections may be utilized, for example a W-profile section 65 as shown in FIGS. 6 and 7. In particular, as shown in FIG. 7, the transitions 66 and 67 from the W-profile section 65 to the remaining part of the elongate suspension element 61 may have smoothened radii.

FIG. 8 shows another example of an elongate suspension element 71, which is similar to the elongate suspension member 51 of FIGS. 3 and 4 and which may be comprised in a suspension arrangement similar to the suspension arrangement 50 shown in FIG. 3. In the cross-sectional view shown in FIG. 8, the elongate suspension element 71 has a U-shaped profile with upwards pointing end sections 72 and 73 and a horizontal base 74. The height of the end sections 72 and 73 may be in the range of a few millimeters or centimeters, for example in a range of 10 to 20 mm, for example 13 mm. The plane of the U-shaped profile is perpendicular to the plane of the meandered shape of the elongate suspension element 71. When a load is acting on the elongate suspension element 71 in a downward direction as indicated by the arrows 75 in FIG. 9, in particular the base 74 of the suspension element 71 is bent downwards. The flat (FIG. 6) or the U-shaped (FIG. 8) profile may be selected to have more or less pretension and pre-stress to create the desired comfort form the seat surface or backrest.

Returning to FIG. 1, the amplitude of the meandered shape may be at least a 20th part of the distance D from the first end 23, 25 to the second end 24, 26 in a relaxed state of the elongate suspension member 21, 22. For example, in the relaxed state, the elongate suspension member 21 may have a length D in the longitudinal direction from the first end 23 to the second end 24 of for example 30 to 50 cm. The amplitude of the meandered shape may be in the range of a few centimetres, for example at least 2 to 5 cm.

Although not shown in FIG. 1, the amplitude of the elongate suspension member may vary along the length of the elongate suspension member. For example, the amplitude of the meandered shape in the middle section may be larger than the amplitude of the meandered shape at the outer sections of the elongate suspension member.

Figure 10:
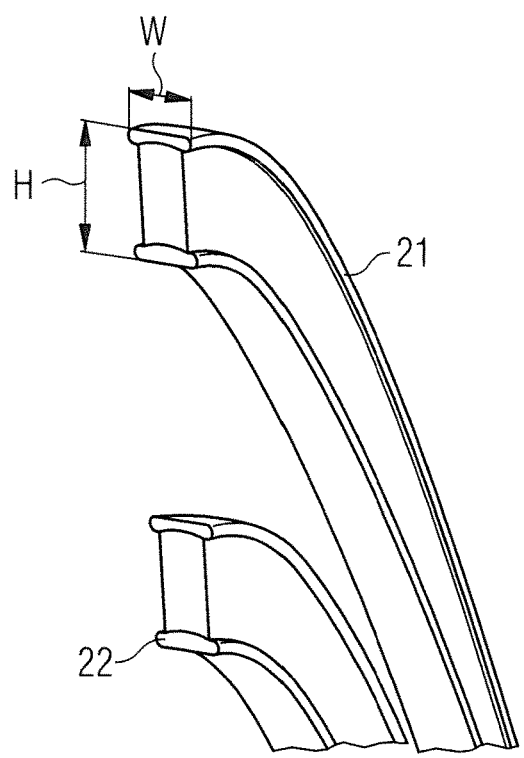
FIG. 10 is a schematic cross-sectional view of elongated suspension members of a suspension arrangement according to an embodiment.
Figure 11:
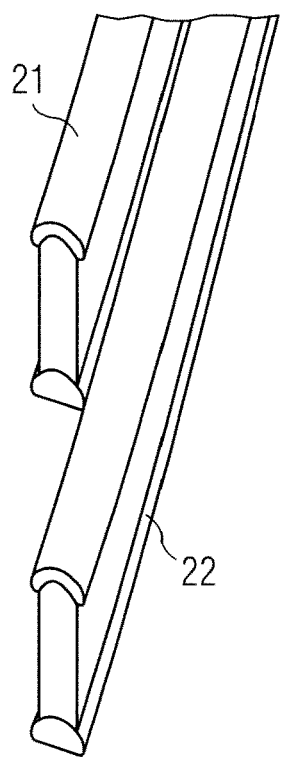
FIG. 11 is a further schematic cross-sectional view of elongate suspension members of a suspension arrangement according to an embodiment.

FIG. 10 shows a cross-sectional view of the elongate suspension members 21, 22 of FIG. 1 at an intersecting plane 36. FIG. 11 shows a cross-sectional view of the elongate suspension members 21, 22 of FIG. 1 at an intersecting plane 37. As can be seen from FIGS. 10 and 11, a cross section of the elongate suspension members 21, 22 may vary along the corresponding elongate suspension member 21, 22 from the first end 23, 25 to the second end 24, 26. In particular, a height H and a width W may vary along the corresponding elongate suspension member 21, 22.

The cross section may have an I-profile. The I-profile may optimize the material volume versus performance. Thus, most material is available in the location where most stress is going through the sinus. The thinner connection is less impacted by stress. Also the corners typically have less glass fibers aligned in the longitudinal direction. Further, the glass fiber orientation in the corners of a rectangular cross section may not be ideal, i.e. may not be oriented longitudinal but more randomly, which may provide a weaker performance. Using an I-profile may compensate this effect.

To avoid weak spots in the material due to the injection process, the design may be adapted at the injection point. The glass fibers typically are arranged in that area in a random way. Randomly oriented fibers may be less resilient in one direction than unidirectional fibers.

An injection area with glass fibers oriented randomly is typically 40% less resilient than areas having glass fibers in the same direction. Therefore, it is desired to enlarge the so-called ideal section, which is the variable section that gives over the full meandered or sinusoidal elongate suspension member the same local stress. In this regard, the local stress throughout the whole part may be minimized. This is needed to achieve low enough stresses in the part to overcome durability issues and creep.

Figure 12:
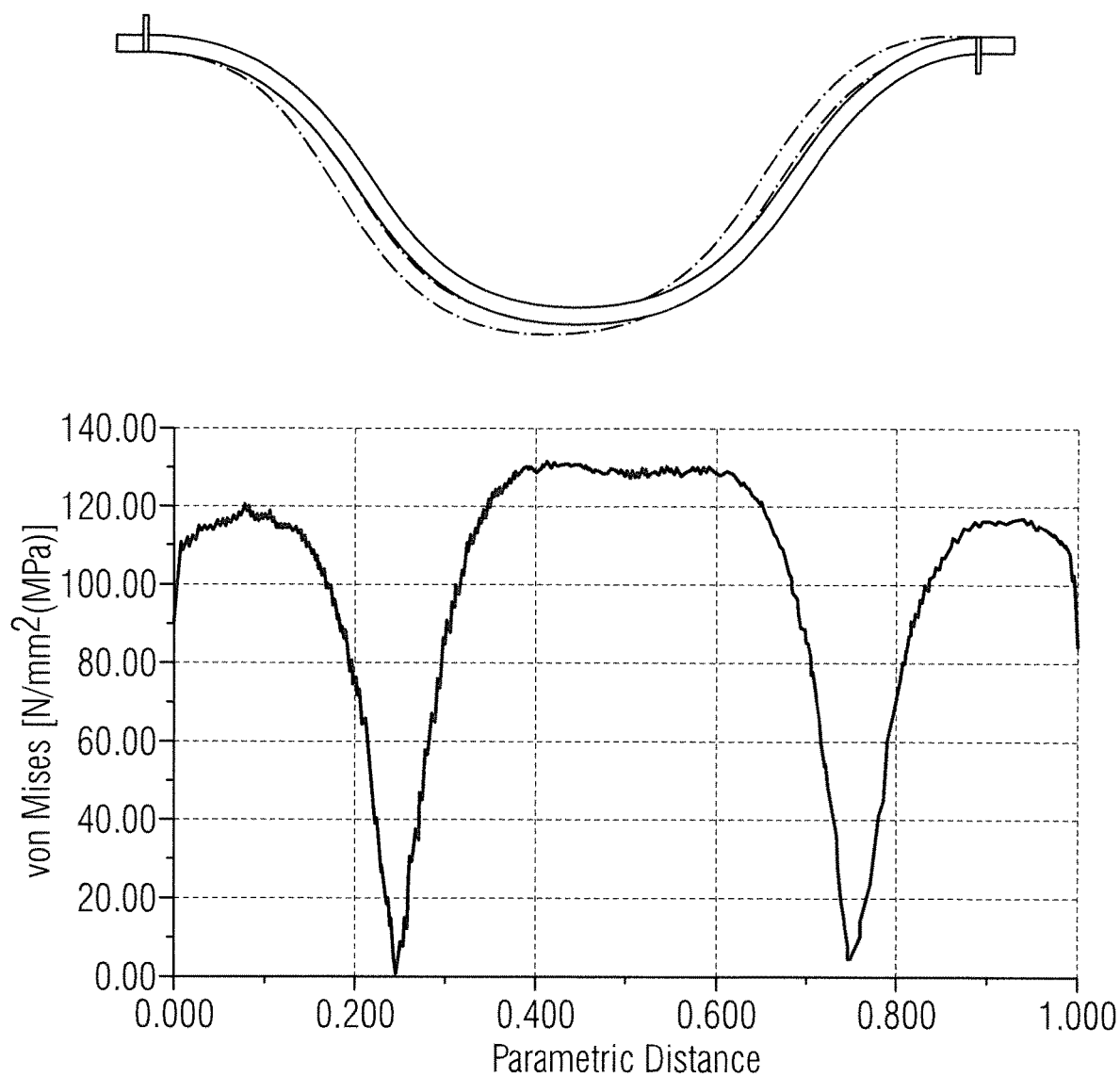
FIG. 12 shows schematically a stress in a meandered elongate suspension member according to an embodiment.

FIG. 12 shows the stress in the material along the meandered elongate suspension member. As can be seen, at the middle point of a sinusoidal shape the local stress becomes a minimum, theoretically zero.

Preferably, the injection is at the ends of the elongate suspension element to avoid such weak spots along the element. Alternatively, the ideal injection point is in the middle point of a sinusoidal shape, because there the local stress comes a minimum.

As an alternative, the thickness in the injection area may be increased to compensate the 40% loss in strength. FIG. 13 shows an injection area in the middle point of a sinusoidal shape (encircled), and FIG. 14 shows the increased thickness of material in this area.

Additionally, all the radii may be very smooth to avoid increase of local stress.

When deflecting the elongate suspension members 21, 22 for example in a direction perpendicular to the plane defined by the longitudinal direction and the direction in which the amplitude of the meandered shape is extending, a strain on each elongate suspension member 21, 22 may depend on the position along the corresponding elongate suspension member 21, 22 from the first end 23, 25 to the second end 24, 26. By varying the height H and the width W along the elongate suspension members 21, 22 in different areas, an evenly spreaded strain may be achieved.

FIG. 15 shows a schematic top view of a further suspension arrangement 120 for a seat, for example for a seat pan or backrest of the seat. The suspension arrangement 120 comprises a plurality of elongate suspension members 121, 122 of glass fibre filled plastic. Although the suspension arrangement 120 shown in FIG. 15 comprises only two elongate suspension members 121, 122, the suspension arrangement 120 may comprise more than these two elongate suspension members 121, 122, for example at least 15 to 25 or even more elongate suspension members of the type shown in FIG. 15.

Each elongate suspension member 121, 122 has in a longitudinal direction thereof a first end and an opposing second end. In FIG. 15, the longitudinal direction is extending from the left to the right. The elongate suspension member 121 may have its first end 123 at the left side in FIG. 15, and may have its second end 124 at the right side in FIG. 15. Likewise, the elongate suspension member 122 may have its first end 125 at the left side and may have its second end 126 at the right side. The elongate suspension member 121, 122 has a meandered shape comprising sections with alternating curvature directions. At each of the first and second ends 123 to 126, a corresponding attachment element 127 to 130 may be provided for attaching the first and second ends to a frame of a seat pan or a backrest of the seat as described above in connection with FIGS. 1 to 9.

Connecting elements 131 to 133 may be provided for coupling the elongate suspension members 121, 122 with each other. As shown in FIG. 15, the elongate suspension member 121 may be coupled at three positions to the elongate suspension member 122 via corresponding connecting elements 131 to 133. The coupling between the elongate suspension members 121, 122 may be at inflection points of the meandered shape as shown in FIG. 15.

FIG. 16 shows schematically a side view of the elongate suspension member 121. As explained in detail in connection with FIG. 2, each connecting element 127 and 128 may provide a corresponding hole 134 and 135, respectively, for attaching the corresponding end of the elongate suspension member to a frame of a seat pan or backrest.

Figure 17:
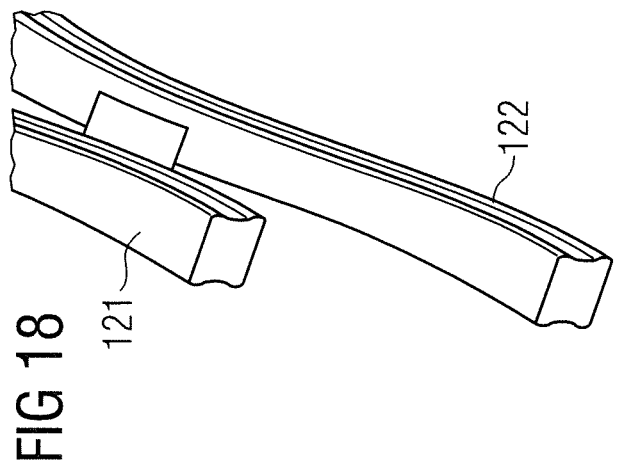
FIG. 17 is a schematic cross-sectional view of elongate suspension members of a suspension arrangement according to an embodiment.
Figure 18:
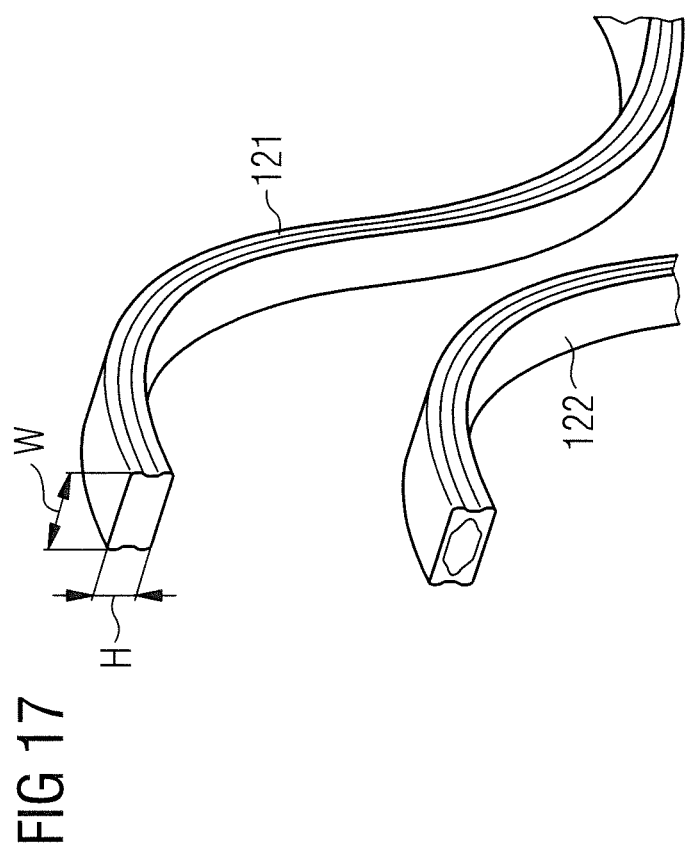
FIG. 18 is a schematic cross-sectional view of elongate suspension members of a suspension arrangement according to an embodiment.

FIG. 17 shows a cross-sectional view of the elongate suspension members 121, 122 of FIG. 15 at an intersecting plane 136. FIG. 18 shows a cross-sectional view of the elongate suspension members 121, 122 of FIG. 15 at an intersecting plane 137. As indicated in FIGS. 10 and 11, a cross-section of the elongate suspension members 121, 122 may vary along the corresponding elongate suspension member in the longitudinal direction. For example, a height H and a width W may vary along the longitudinal direction of the elongate suspension members 121, 122 from the first ends 123, 125 to the second ends 124, 126. By varying the height H and the width W along the elongate suspension members 121, 122 in different areas, an evenly spreaded strain may be achieved when the elongate suspension members 121, 122 are deflected.

Figure 19:
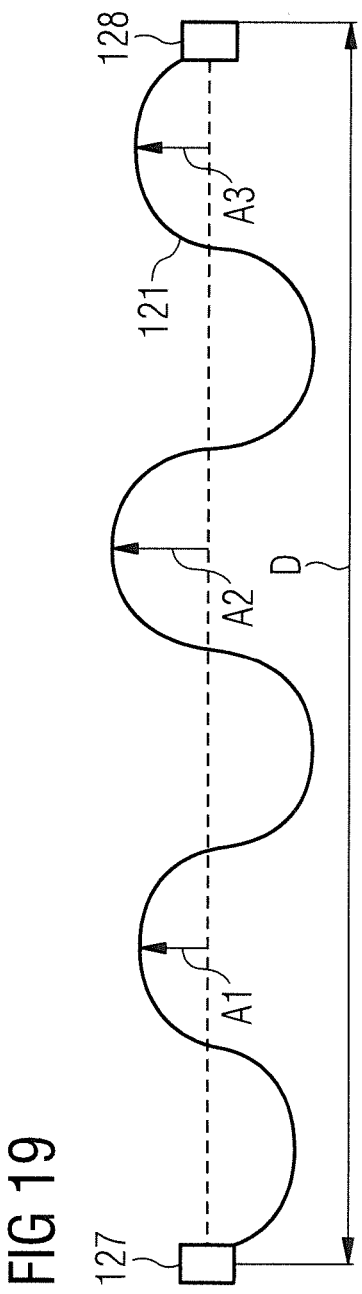
FIG. 19 is a schematic view of an elongate suspension member of a suspension arrangement according to an embodiment.

Furthermore, the amplitude of the elongate suspension members 121, 122 may vary along the length of the elongate suspension members 121, 122 as shown schematically in FIG. 19. For example, the amplitude A2 of the meandered shape in the middle section may be larger than the amplitudes A1 and A3 of the meandered shape at the outer sections of the elongate suspension member 121. By varying the amplitude, suspension properties may be varied as required and strain peaks in the material of the elongate suspension members 121, 122 may be avoided.

Figure 20:
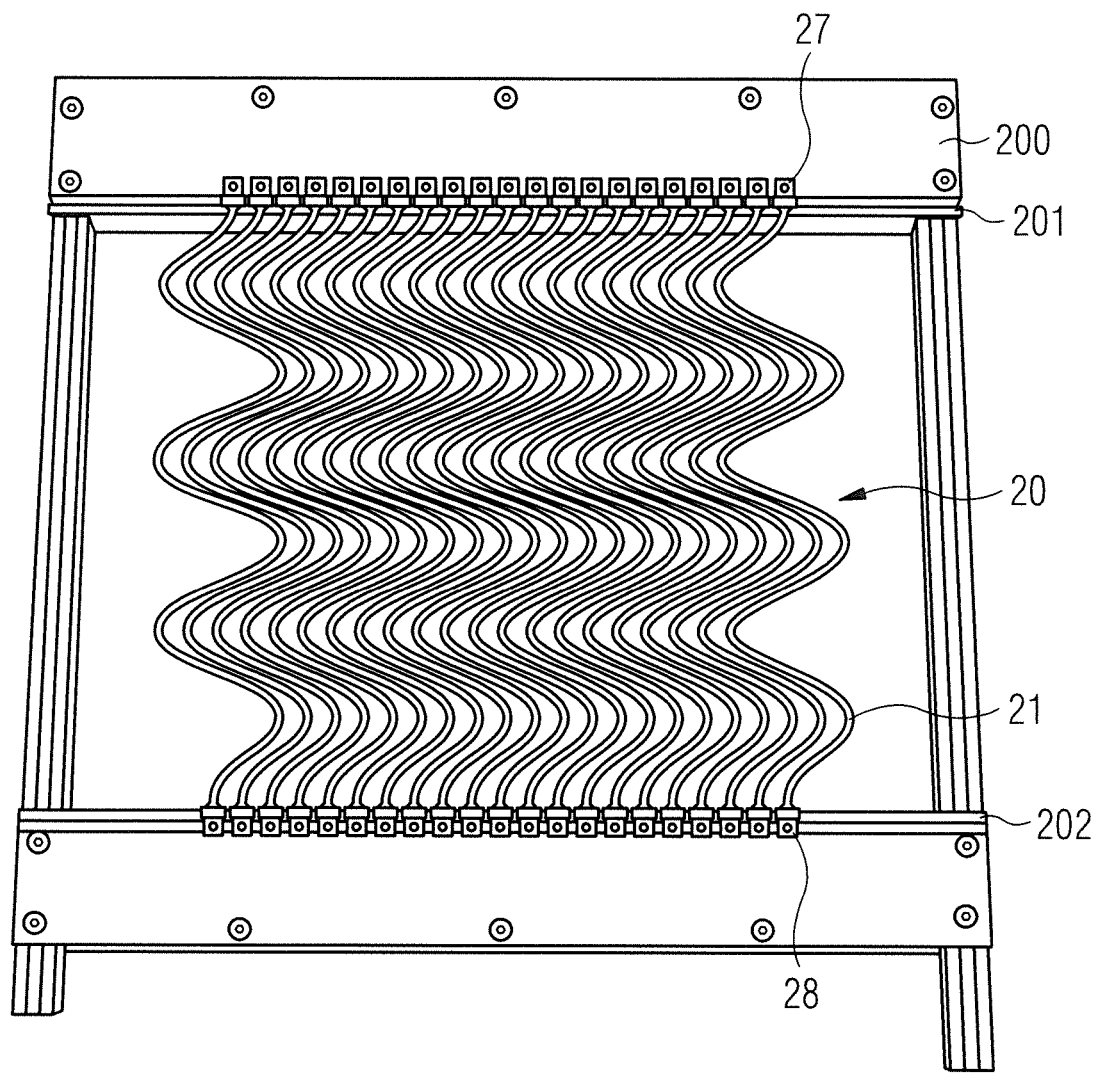
FIG. 20 is a schematic top view of a seat pan according to an embodiment.

FIG. 20 shows a frame 200 in combination with the suspension arrangement 20. In the example shown in FIG. 20, the suspension arrangement 20 comprises 21 elongate suspension members, wherein one of the elongate suspension members is referenced by reference sign 21. The elongate suspension member 21 has a first end 23 and a second end 24. The remaining elongate suspension members of the suspension arrangement 20 are arranged in parallel to the elongate suspension member 21 in a plane of the frame 200. The frame 200 comprises a first rod 201 and a second rod 202. The first ends 23 of the elongate suspension members attached to the first rod 201, for example by at least partially enclosing the rod 201, for example by means of holes 34 in attachment elements 27 at the first ends 23. Likewise, the second ends 24 of the elongate suspension members may be attached to the second rod 202 by at least partially enclosing the rod 202, for example by means of holes 35 in attachment elements 28 at the second ends 24. The elongate suspension members 21 may be attached to the frame 200 in a state, in which the elongate suspension members are pre-stressed in their longitudinal direction, for example by stretching each elongate suspension member by an addition length of about 3%-10% of the length in the relayed state. Each elongate suspension member may be pre-stressed by an individual additional length.

Figure 21:
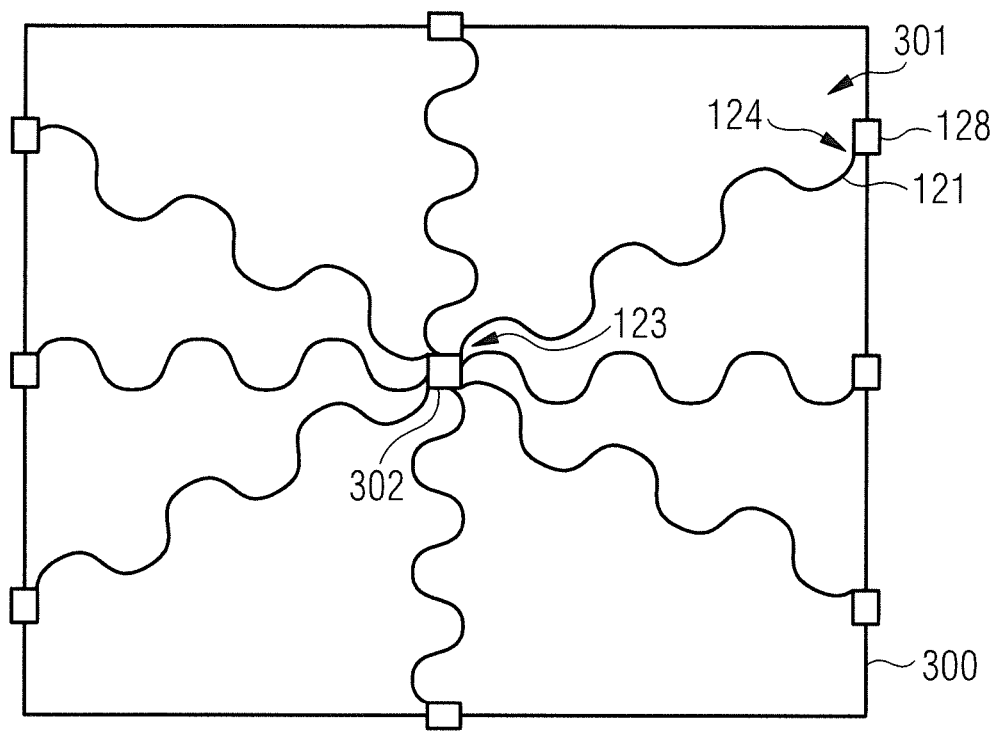
FIG. 21 is a schematic top view of a seat pan according to an embodiment.

FIG. 21 shows a further example of a frame 300 in combination with a suspension arrangement 301. The suspension arrangement 301 comprises elongate suspension members of the type which were explained above in connection with FIGS. 15 to 19. However, in the suspension arrangement 301 the elongate suspension members are coupled to each other at their first ends and extend in different radial directions to be connected to the frame 300 with their second ends. The frame 300 may be part of a seat, for example part of a seat pan or part of a backrest of the seat. A connecting element 302 is provided for coupling the first ends of the elongate suspension members. One of the elongate suspension members is indicated by reference sign 121. The first end of the elongate suspension member 121 is referenced by reference sign 123 and the second end is referenced by the reference sign 124. At the second end an attachment element 128 is provided for coupling the second end 124 of the elongate suspension member 121 to the frame 300, for example to a rod of the frame 300. The frame 300 may comprise four rods which are arranged for example in a rectangle and the elongate suspension members are extending from a central position of the connecting element 302 in radial directions to an edge of the frame. As indicated in FIG. 21, for example at least one elongate suspension member extends from the central connecting element 302 to each rod of the frame. Preferably, at least three to five elongate suspension members extend from the central connecting element 302 to each rod of the frame.

Figure 22:
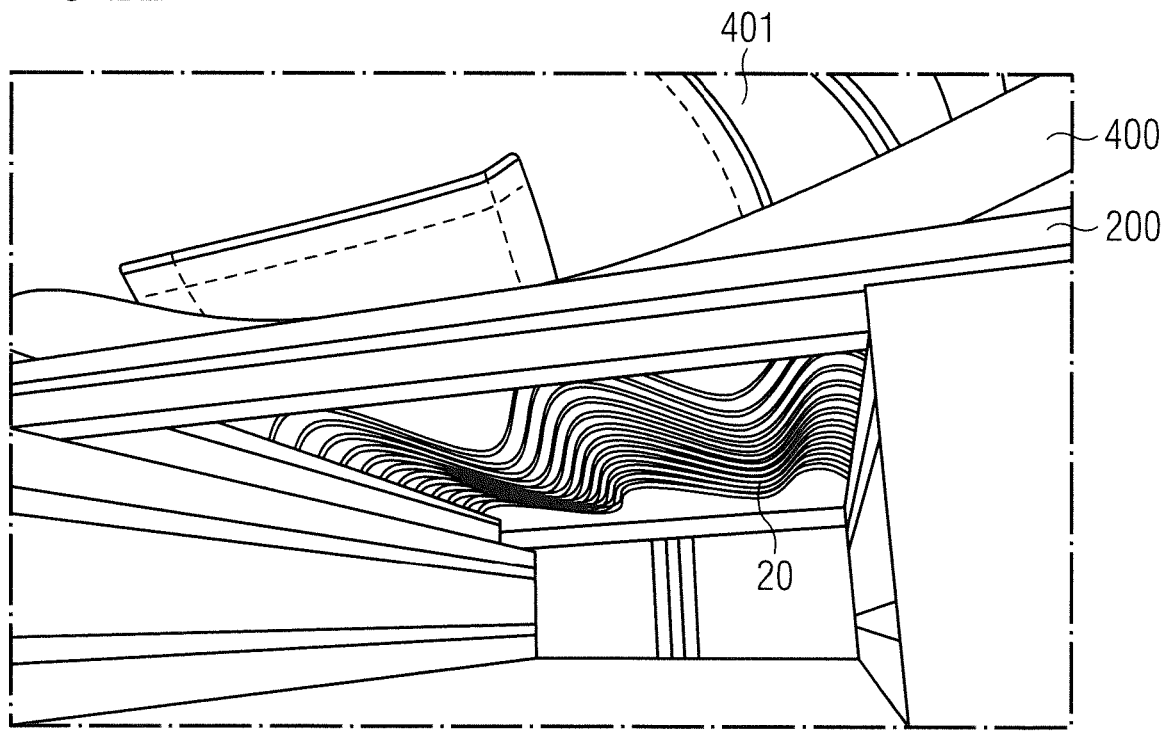
FIG. 22 is a schematic perspective view of a seat pan according to an embodiment.

FIG. 22 shows the frame 200 and the suspension arrangement 20 of FIG. 20 in combination with a foam support 400, which is arranged on the plurality of elongate suspension members of the suspension arrangement 20. The combination of the frame 200 and the suspension arrangement 20 may be part of a seat pan of a seat, for example of a seat of a vehicle. When a user 401 is sitting on the foam support 400 as shown in FIG. 22, the suspension arrangement 20 may be deflected such that the elongate suspension members are stretched.

The above-described elongate suspension members 21, 22, 121 and 122 may be made of a glass fibre filled plastic, for example polyphtalamide (PPA) with a glass fibre content in a range of 50% to 60%. Available plastic products are TEREZ HT 100 HG 50 or TEREZ HT 100 HG 60 from the TER HELL PLASTIC GmbH. Glass fibre filled PPA may have a very low moisture uptake compared to for example other polyamides. Moisture may have the effect of softening the material and reducing the total level of stress amplitude and fatigue resistance. The reinforcement level of 50% to 60% glass fibre content may further higher the possible stress amplitude and therefore fatigue resistance. Additionally, the plastic may comprise an amount of polytetrafluoroethylene in a range of 0.5 to 5% by weight. This may further increase the stress amplitude.

A plastic like PPA may have a much higher glass transition temperature than for example conventional nylons. For example the glass transition temperature of PPA may be in the range of 130° C., whereas the glass transition temperature of conventional nylons is in the range of 65°. In connection with glass fibre reinforcing the plastic, in particular PPA, creeping and temperature sensitivity of the elongate suspension members may be reduced. This may be in particular significant in the area of automobiles, where temperatures in a range of −30° C. up to 60° C. or even in excess thereof may occur.

When producing the above-described elongate suspension member, a gas may be mixed into the glass fibre filled plastic, and the mixture of gas and glass fibre filled plastic may be injected—using an appropriate injection moulding technique, such as Variotherm injection moulding—into a mould having a moulding cavity with the meandered shape described above. By mixing gas into the plastic, for example into PPA, cycle times may be reduced, for example by reducing injection and cooling times. Furthermore, warpage may be optimised by lowering the viscosity which helps to push the material through the small meandering mould more easily without the need of many injection points.

Figure 23:
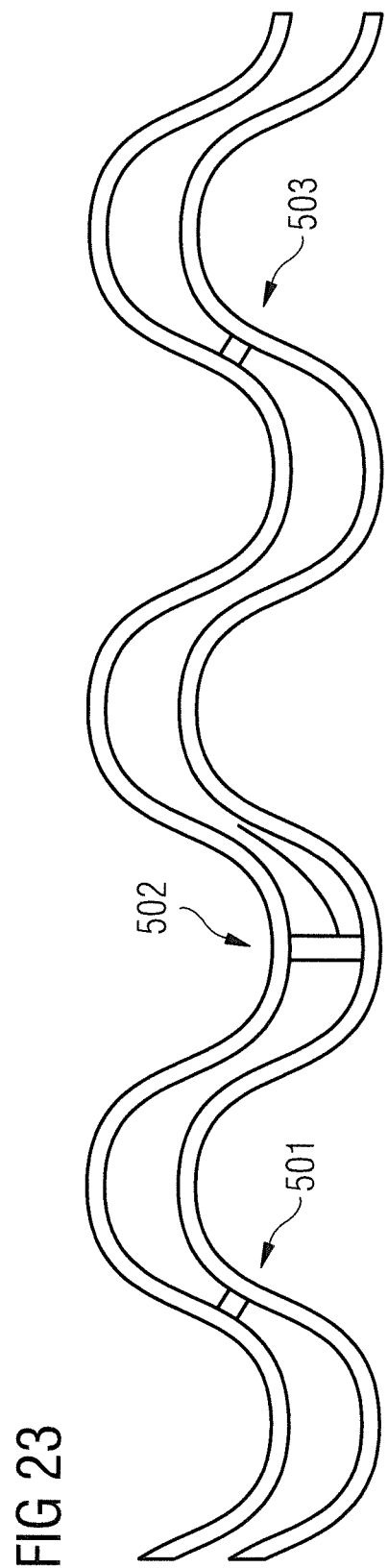
FIG. 23 is a schematic view of multiple injection points at elongate suspension members of a suspension arrangement according to an embodiment.

Due to the low viscosity multiple injection points may be used. To avoid parting lines in the final product, a cascading injection run may be utilized. An example is illustrated in connection with FIG. 23. First, in point 501 the injection will start. As soon as the material flow goes past injection point 502, also that injection nozzle will start pushing material in, and then the same for injection point 503.

Tempering may further improve properties of the glass fibre filled plastic. Tempering in the meaning of the present application may include stabilising the glass fibre filled plastic by heating, which is also called annealing. Parameters for tempering may include the tempering temperature as well as the duration of the tempering. Creeping may be significantly reduced by tempering the elongate suspension member for example at a temperature of 230° C. for 20 minutes or at a temperature of 130° C. for two hours. The creeping of the elongate suspension member being tangent by a tensile force of 13 N for one day at a temperature of 70° C. may be reduced by tempering from more than 4% to about 1%.

What is claimed is:

1. A suspension arrangement for a seat comprising a plurality of elongate suspension members of a glass fiber filled plastic,
   wherein each elongate suspension member of the plurality of elongate suspension members includes in a longitudinal direction thereof a first end and an opposing second end,
   wherein the elongate suspension member has a meandered shape in the longitudinal direction,
   wherein a first elongate suspension member of the plurality of elongate suspension members has the same meandered shape as a second elongate suspension member of the plurality of elongate suspension members,
   wherein the first and second elongate suspension members are arranged spaced apart in a parallel manner in a plane extending in the longitudinal direction and in a direction of an amplitude of the meandered shape, and
   further including a connecting element for connecting the first elongate suspension member and the second elongate suspension member, wherein the first elongate suspension member and the second elongate suspension member are connected to each other at an inflection point of the meandered shape.

2. The suspension arrangement of claim 1, wherein the meandered shape comprises a plurality of curved sections with alternating curvature directions.

3. The suspension arrangement of claim 1, wherein the meandered shape comprises a sinusoidal section.

4. The suspension arrangement of claim 1, wherein an amplitude of the meandered shape is at least $\frac{1}{30}$ of a distance from the first end to the second end in a relaxed state of the elongate suspension member.

5. The suspension arrangement of claim 4, wherein an amplitude of the meandered shape is at least $\frac{1}{20}$ of a distance from the first end to the second end in a relaxed state of the elongate suspension member.

6. The suspension arrangement of claim 1, wherein an amplitude of the meandered shape varies along the longitudinal direction.

7. The suspension arrangement of claim 1, wherein, in the longitudinal direction of the elongate suspension member, an amplitude at a central section is larger than an amplitude at a section between the central section and the first end or an amplitude at a section between the central section and the second end.

8. The suspension arrangement of claim 1, wherein the elongate suspension members are coupled to each other at their first ends and extend in different radial directions to be connected to a frame of the seat with their second ends.

9. The suspension arrangement of claim 1, wherein a cross section of an elongate suspension member of the plurality of elongate suspension members varies depending on a position along the elongate suspension member from the first end to the second end.

10. The suspension arrangement of claim 1, wherein the plastic comprises polyphthalamide.

11. The suspension arrangement of claim 1, wherein the plastic comprises medium viscosity partly aromatic polyamide.

12. The suspension arrangement of claim 1, wherein the glass fiber filled plastic comprises plastic with a glass fiber content in a range of 50% to 60%.

13. The suspension arrangement of claim 1, wherein the glass fiber filled plastic comprises polytetrafluoroethylene.

14. The suspension arrangement of claim 1, wherein the glass fiber filled plastic comprises an amount of polytetrafluoroethylene in a range of 0,5 to 5% by weight.

15. The suspension arrangement of claim 1, wherein the suspension arrangement is configured as a suspension arrangement for a seat pan.

16. The suspension arrangement of claim 1, wherein the meandered shape of the elongate suspension member is arranged in a first plane, wherein end sections between the meandered shape and the first and second ends are arranged in a second plane, which is perpendicular to the first plane.

17. A seat comprising:
a frame; and
a suspension arrangement comprising a plurality of elongate suspension members of a glass fiber filled plastic,
wherein each elongate suspension member of the plurality of elongate suspension members includes in a longitudinal direction thereof a first end and an opposing second end,
wherein the elongate suspension member has a meandered shape in the longitudinal direction,
wherein at least one of the first and second ends of at least one elongate suspension member of the plurality of elongate suspension members is attached to the frame,
wherein a first elongate suspension member of the plurality of elongate suspension members has the same meandered shape as a second elongate suspension member of the plurality of elongate suspension members,
wherein the first and second elongate suspension members are arranged spaced apart in a parallel manner in a plane extending in the longitudinal direction and in a direction of an amplitude of the meandered shape, and
further including a connecting element for connecting the first elongate suspension member and the second elongate suspension member, wherein the first elongate suspension member and the second elongate suspension member are connected to each other at an inflection point of the meandered shape.

18. The seat of claim 17, wherein the at least one elongate suspension member is attached to the frame in a state in which the at least one elongate suspension member is pre-stressed in its longitudinal direction.

19. The seat of claim 17, wherein the frame comprises a rod, wherein the at least one of the first and second ends is attached to the rod by at least partially enclosing a section of the rod.

20. The seat of claim 17, wherein the suspension arrangement comprises at least 15 elongate suspension members.

21. The seat of claim 17, wherein the seat comprises a foam support arranged on the plurality of elongate suspension members.

22. The seat of claim 17, wherein the frame and the plurality of elongate suspension members are integrally formed.

23. The seat of claim 17, wherein the seat comprises a seat pan having the frame.

24. A method for producing an elongate suspension member for a suspension arrangement for a seat, wherein the elongate suspension member includes in a longitudinal direction a first end and an opposing second end, wherein the elongate suspension member has a meandered shape in the longitudinal direction, the method comprising:
mixing gas into a glass fiber filled plastic; and
injecting the mixture of gas and glass fiber filled plastic into a mould having a moulding cavity with the meandered shape.

25. The method of claim 24, further comprising tempering the glass fiber filled plastic.

26. The method of claim 24, further comprising tempering the glass fiber filled plastic at a temperature of at least 130° C.

27. The method of claim 24, further comprising tempering the glass fiber filled plastic for at least 20 minutes.

28. The method of claim 24, wherein the method is for producing the elongate suspension member of the suspension arrangement of claim 1.

* * * * *